United States Patent [19]

Jensen

[11] Patent Number: 4,947,647
[45] Date of Patent: Aug. 14, 1990

[54] ENERGY STORAGE AND GENERATION HYDRO WELL APPARATUS

[76] Inventor: Robert K. Jensen, 14990 Echo Dr., Golden, Colo. 80401

[21] Appl. No.: 460,821

[22] Filed: Jan. 4, 1990

[51] Int. Cl.$^5$ ............................................. F03B 13/10
[52] U.S. Cl. ........................................ 60/659; 60/652; 60/398
[58] Field of Search .................... 60/652, 659, 641.6, 60/641.7, 398

[56] References Cited

U.S. PATENT DOCUMENTS

| | | | |
|---|---|---|---|
| 3,939,356 | 2/1976 | Loane | 60/398 X |
| 4,245,475 | 1/1981 | Girden | 60/641.7 |
| 4,454,721 | 6/1984 | Hurlimann | 60/659 |

Primary Examiner—Allen M. Ostrager
Attorney, Agent, or Firm—Dorr, Carson, Sloan & Peterson

[57] ABSTRACT

An energy storage and generation apparatus is formed by a vertical tube extending downward into a body of water with an upper opening near the surface of the water that permits a flow of water down the tube. A stream of air bubbles is introduced into the water, which is subject to hydraulic compression as the water falls. A separation chamber located at the lower end of the vertical tube separates the compressed air from the water. An exhaust tube extends upward from the lower portion of the separation chamber with an upper opening located below the surface of the body of water. A number of orifices introduce streams of air bubbles into the exhaust tube to induce a flow of water from the separation chamber through the exhaust tube. An air compressor initially powered by an external energy source supplies ambient air to these orifices during off-peak periods to maintain a flow of water through the apparatus to build a reservoir of compressed air in the separation chamber. In addition, a tube 12 extends from the upper portion of the separation chamber to these orifices to supply air to the orifices during periods of peak demand for electricity. A generator produces power from the resulting flow of water through the exhaust tube during these peak periods.

5 Claims, 1 Drawing Sheet

ENERGY STORAGE AND GENERATION HYDRO WELL APPARATUS

BACKGROUND OF THE INVENTION

1. Field of the Invention

The present invention relates generally to the field of energy storage devices used to satisfy periods of peak demand for electricity. More specifically, the present invention discloses an energy storage device which creates a reservoir of compressed air by hydraulic air compression during periods of low demand of electricity, and then uses the compressed air to generate electricity during periods of peak demand.

2. Statement of the Problem

The demand for electricity faced by public utilities fluctuates on a seasonal basis and during the course of each day. Periods of peak demand for electricity typically occur during hot weather in the summer months, and in particular during late summer afternoons when air-conditioning loads are at a maximum. It is very expensive for an electrical utility to construct and maintain sufficient electrical generating capacity to meet such periods of peak demand. In recognition of this problem, public utilities have adopted a number of conservation strategies to help reduce peak electrical demands, such as load shedding and peak demand billing. On the supply side, utilities have created a network of interconnections to allow surplus electrical power to be bought and sold between utilities to help smooth out regional peak loads. However, the price of purchasing power during peak periods can be very high. Some utilities have constructed pumped storage facilities in which water is pumped into a reservoir during off-peak periods, and then used to generate hydro-electric power during peak periods. However, these facilities generally require construction of a dam to create the reservoir. Japan uses pumped storage to a greater degree than the United States. Forty five percent of Japan's hydroelectric power is by pumped storage, in comparison to less than one percent in the United States. Planning for peak demand became more difficult for the utility companies when the Public Utility Regulatory Policies Act of 1978 ("PURPA") became law. It insured non-utility power producers a market for their electricity by requiring the utilities to buy it at competitive rates. Since 1980, independent power producers have accounted for and will continue to furnish most of the replacement and growth needs of the industry.

The prior art contains several patents dealing with hydraulic air compression and use of air bubbles to create fluid movement, including the following:

| Inventor | Patent No. | Issue Date |
|---|---|---|
| Jensen | 4,703,626 | Nov. 3, 1987 |
| Bervig | 4,392,062 | July 5, 1983 |
| Santangelo, et al. | 3,765,727 | Oct. 16, 1973 |
| Busick | 4,135,364 | Jan. 23, 1979 |
| Angle | 4,278,405 | July 14, 1981 |
| Girden | 4,355,513 | Oct. 26, 1982 |

The inventor's previous patent, U.S. Pat. No. 4,703,626 discloses an energy conversion apparatus used to generate electricity using ocean thermal gradients and salinity gradients. Air bubbles are introduced into the flow of warm, high-salinity sea water downward at the upper opening of the apparatus. This air is subject to hydraulic compression as the water falls. The flow of sea water and air drives a turbine to produce electricity, and then passes through a cooling tube near the bottom of the apparatus where it is cooled to the ambient ocean temperature at that depth. The flow then enters a chamber where the air and water are allowed to separate. Because of its greater density than the ambient sea water at that depth, the water in the chamber tends to flow out exhaust ports located at the bottom of the separation chamber.

Bervig discloses an energy storage and generation device in which air is compressed, by means of a conventional air compressor, and stored in a large tank during off-peak periods. During periods of peak power demand, compressed air from the tank is released to create bubbles in one leg of a U-shaped conduit filled with fluid. The resulting circulation of fluid within the conduit is used to drive a generator to produce power.

Santangelo, et al., disclose an apparatus for transporting mined deposits, such as manganese nodules, from the sea floor by injecting air into a dredge pipe at a location somewhat below the surface of the water. The air bubbles cause an upward flow of water and accompanying mined materials from the bottom opening of the dredge pipe to the ocean surface.

Busick discloses an apparatus in which air bubbles are introduced into a number of vertical tubes immersed in water. The resulting upward flow of water is used to drive a turbine-like fluid motor.

Angle discloses an apparatus for producing compressed air by entraining air in a downward flow of water. A separating cone and chamber are used to separate the air from the water at the bottom of the apparatus.

Girden discloses an apparatus for generating power by bubbling air through vertical tubes immersed in the ocean. The air bubbles cause an upward flow of cool sea water through the tubes. This creates a region of cool air above the ocean which creates winds used to drive windmills to produce power.

3. Solution to the Problem

None of the prior art references uncovered in the search show the specific structure of the present invention. In particular, none of the prior art references use hydraulic air compression to create a reservoir of compressed air during off-peak periods, that is used to create air bubbles to induce a flow of water to drive a turbine and thereby generate power during periods of peak demand for electricity.

SUMMARY OF THE INVENTION

This invention provides an apparatus to store energy during off-peak periods of electrical demand and to generate electricity from the stored energy during peak periods. The apparatus consists of a vertical tube extending downward into a body of water with an upper opening near the surface of the water that permits a flow of water down the tube. A stream of air bubbles is introduced into the water, which is subject to hydraulic compression as the water falls. A separation chamber located at the lower end of the vertical tube separates the compressed air from the water. An exhaust tube extends upward from the lower portion of the separation chamber with an upper opening located below the surface of the body of water. A number of orifices introduce streams of air bubbles into the exhaust tube to induce a flow of water from the separation chamber through the exhaust tube. An air compressor that is initially powered by an external energy source supplies ambient air to these orifices during off-peak periods to maintain a flow of water through the apparatus to build a reservoir of compressed air in the separation chamber. In addition, a tube extends from the upper portion of the separation chamber to these orifices to supply air to the orifices during periods of peak demand for electricity. A generator produces power from the resulting flow of water through the exhaust tube during these peak periods. This power can either be applied for external use, or alternatively can be used to provide some or all of the power to drive the air compressor on a continuing basis.

A primary object of the present invention is to provide a modular, relatively compact device for efficiently storing significant quantities of energy to meet periods of peak electrical demand.

Another object of the present invention is to provide an energy storage and generation device which releases no pollutant and has a minimal environmental impact.

These and other advantages, features, and objects of the present invention will be more readily understood in view of the following detailed description and the drawings.

BRIEF DESCRIPTION OF THE DRAWINGS

The present invention can be more readily understood in conjunction with the accompanying FIGURE showing a vertical cross-sectional view of the apparatus.

DETAILED DESCRIPTION OF THE INVENTION

Figure 1:
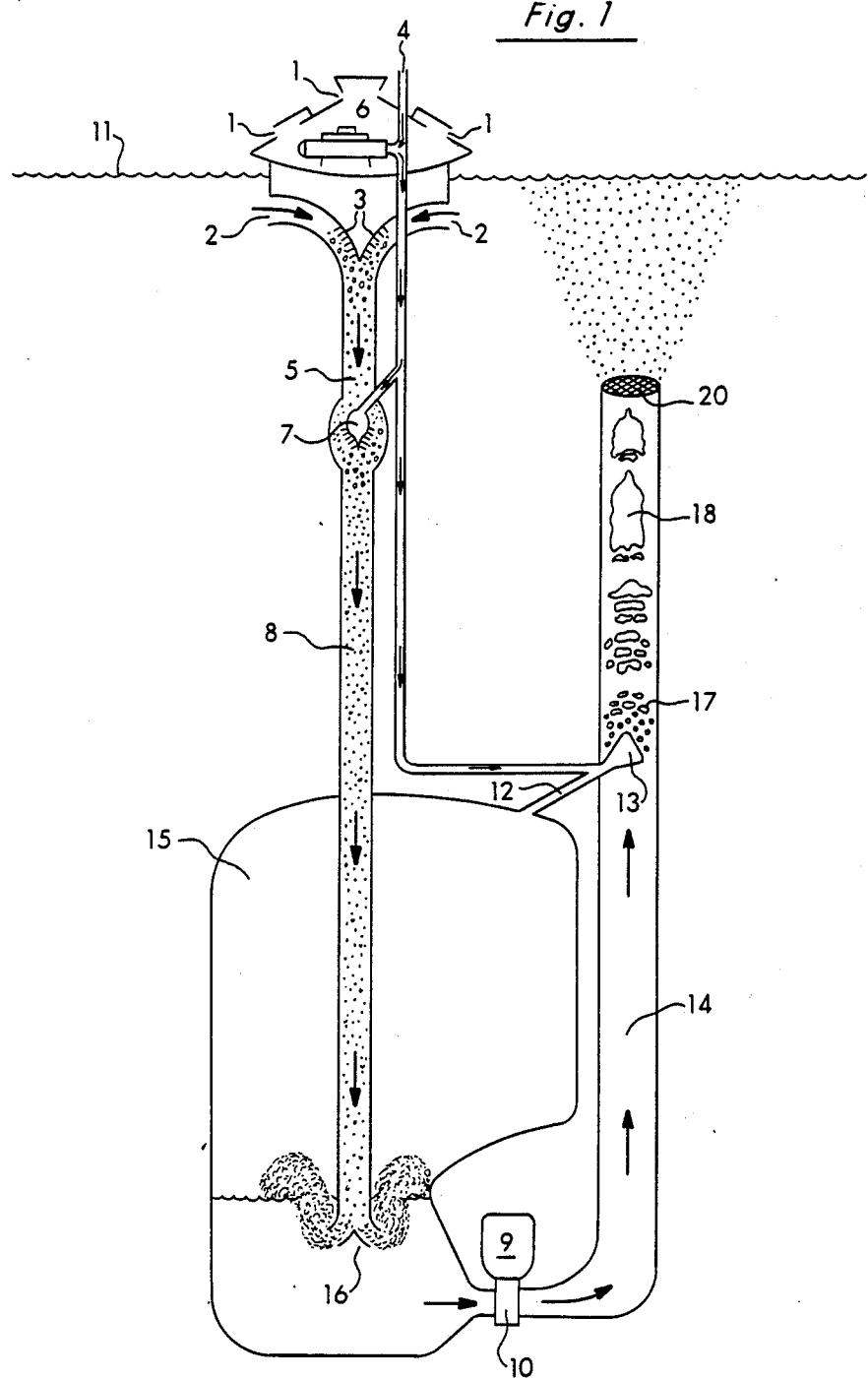

Turning to FIG. 1, a simplified vertical cross-sectional view of the present invention is shown. As will be discussed at greater length below, the apparatus has two basic modes of operation, corresponding to peak and off-peak periods of demand for electricity. During off-peak periods, the air compressor 6 shown inside the housing at the upper end of the apparatus is used to power a flow of water and air through the apparatus by providing compressed air to the orifices 13 inside the exhaust tube 14. This induces a flow of water from the bottom portion of the separation chamber 15 through the exhaust tube 14, which in turn permits a continued flow of water and entrained air bubbles from the surface 11 downward through the vertical tube 5 and 8 to the separation chamber 15. In this mode of operation, a reservoir of compressed air is gradually accumulated in separation chamber 15 by hydraulic compression of the air bubbles entrained in the flow downward through the vertical tube.

The second mode occurs during periods of peak demand for electricity. It is assumed that the reservoir of compressed air in the separation chamber 15 has approximately reached its storage capacity. The air compressor 6 is either slowed or completely turned off. Compressed air from the separation chamber 15 is supplied through a tube 12 to the orifices 13 in the exhaust tube 14 to maintain the flow of water from the lower portion of the separation chamber 15 through the exhaust tube 14. The supply of compressed air to the orifices 13 may be supplemented by the air compressor 6, if necessary, to maintain desired flow rates through the exhaust tube 14. A turbine 10 located in the exhaust tube 14 is employed to drive an electrical generator 9 to produce electricity from this flow of water for external use and/or to drive the air compressor 6.

The following is a more detailed description of the individual components of the present invention. An enclosed housing is positioned so that a portion of the housing is above the surface 11 of the body of water, and a portion is below the surface. A number of openings 1 in the upper portion of the housing permit ambient air to be drawn into the interior of the housing. This housing also contains an air compressor 6 which takes in ambient air through an external vent 4 and supplies compressed air to a number of other components of the apparatus, as will be discussed at greater length below. This air compressor is initially powered by an external energy source while charging the reservoir of compressed air in the separation chamber 15. However, after the reservoir has been charged and power is being generated by the generator 9, the generator can be used to provide at least some of the power necessary to drive the air compressor 6.

Attached to the bottom of the housing is the upper portion of a vertical tube 5 which extends downward into the water. The vertical tube 5 has a number of openings 2 at its upper end, immediately below the surface 11 of the body of water. These openings 2 allow water to flow into and down the vertical tube 5. A number of orifices 3 permit ambient air to be drawn by the Venturi effect through the interior of the housing into the flow of water down the vertical tube. The air bubbles entrained in the flow water are gradually compressed by hydraulic air compression as they descend down the vertical tube.

Additional orifices 7 located between the upper segment 5 and the lower segment 8 of the vertical tube can be used to introduce additional air bubbles into the flow. These orifices 7 are supplied with compressed air by the air compressor 6.

A large separation chamber 15 is located at the lower end of the vertical tube 8. The water and air bubbles emerging from the vertical tube pass over a cone 16 within the separation chamber 15 to separate the air bubbles from the water. The air tends to accumulate in the upper portion of the separation chamber 15, while the water accumulates in the lower portion.

An exhaust tube 14 extends substantially vertically upward from the lower portion of the separation chamber 15. A turbine 10 is located within this exhaust tube 14, and can be used to drive an electrical generator 9. A number of orifices 13 are also located within the exhaust tube 14 downstream from the turbine 10. As mentioned previously, these orifices 13 introduce a stream of air bubbles 17 into the exhaust tube 14, thereby inducing a flow of water from the lower portion of the separation chamber 15 upward through the exhaust tube 14. Compressed air is supplied to the orifices 13 either by the air compressor 6, or from the reservoir of compressed air held in the separation chamber 15 through a connecting tube 12, or a combination of both, depending upon which mode of operation is in effect.

As shown in FIG. 1, the air bubbles 17 produced by the orifices 13 gradually coalesce into large slug-shaped bubbles 18 as they rise within the exhaust tube 14. This further increases the effective movement of water within the exhaust tube. A screen 20 is placed across the upper opening of the exhaust tube to disperse these large slug-shaped bubbles into smaller bubbles as they exit the exhaust tube 14.

The above disclosure sets forth a number of embodiments of the present invention. Other arrangements or embodiments, not precisely set forth, could be practiced under the teachings of the present invention and as set forth in the following claims.

I claim:

1. An energy storage and generation apparatus comprising:
    a vertical tube extending downward into a body of water with an upper opening near the surface of the water to permit a flow of water into said upper opening and down said vertical tube;
    air induction means suitable for introducing a stream of air bubbles into the water flowing down the vertical tube;
    a separation chamber located at the lower end of said vertical tube adapted to separate the air from the flow of water emerging from the lower end of the vertical tube;
    an exhaust tube extending upward from the lower portion of said separation chamber with an upper opening located below the surface of the body of water;
    a number of orifices to allow streams of air bubbles to be introduced into said exhaust tube to induce a flow of water from said separation chamber through said exhaust tube;
    air compression means adapted to supply ambient air to said orifices;
    a tube extending from the upper portion of said separation chamber to said orifices, adapted to supply air from said separation chamber to said orifices; and
    generator means adapted to produce power from the flow of water through said exhaust tube.

2. The apparatus of claim 1, wherein the separation chamber further comprises a separation cone located in the separation chamber below the lower end of the said vertical tube to separate the entrained air bubbles from the flow of water.

3. The apparatus of claim 1 wherein said exhaust tube extends substantially vertically upward from the lower portion of said separation chamber with said orifices located a substantial distance below the upper end of said exhaust tube.

4. An energy storage and generation apparatus comprising:
    a housing positioned such that the upper portion of said housing remains above the surface of a body of water and the lower portion of said housing is below the surface of said body of water, said housing having a number of openings through said upper portion to permit ambient air to enter the interior of said housing;
    a vertical tube extending downward from said housing into said body of water with an upper opening near the surface of the water to permit a flow of water into said upper opening and down said vertical tube;
    air induction means suitable for introducing a stream of air bubbles from the interior of said housing into the water flowing down the vertical tube;
    a separation chamber located at the lower end of said vertical tube adapted to separate the air from the flow of water emerging from the lower end of the vertical tube, said separation chamber being located at a depth below the surface of the water sufficient to result in hydraulic compression of the air bubbles entrained with the water flowing down the vertical tube;
    an exhaust tube extending upward from the lower portion of said separation chamber with an upper opening located below the surface of the body of water;
    a number of orifices to allow streams of air bubbles to be introduced into said exhaust tube to induce a flow of water from said separation chamber through said exhaust tube;
    air compression means within said housing, adapted to supply compressed ambient air to said orifices;
    a tube extending from the upper portion of said separation chamber to said orifices, adapted to supply compressed air from said separation chamber to said orifices; and
    generator means adapted to produce power from the flow of water through said exhaust tube.

5. An energy storage and generation apparatus for storing energy during off-peak periods and generating energy during peak periods, said apparatus comprising:
    a vertical tube extending downward into a body of water with an upper opening near the surface of the water to permit a flow of water into said upper opening and down said vertical tube;
    air induction means suitable for introducing a stream of air bubbles into the water flowing down the vertical tube;
    a separation chamber located at the lower end of said vertical tube adapted to separate the air from the flow of water emerging from the lower end of the vertical tube, said separation chamber being located at a depth below the surface of the water sufficient to result in hydraulic compression of the air bubbles entrained with the water flowing down the vertical tube;
    an exhaust tube extending upward from the lower portion of said separation chamber with an upper opening located below the surface of the body of water;
    a number of orifices to allow streams of air bubbles to be introduced into said exhaust tube to induce a flow of water from said separation chamber through said exhaust tube;
    air compression means powered by an external energy source during said off-peak periods, adapted to supply ambient air to said orifices;
    a tube extending from the upper portion of said separation chamber to said orifices, adapted to supply air from said separation chamber to said orifices during said peak periods; and
    generator means adapted to produce power from the flow of water through said exhaust tube during said peak periods.

* * * * *